(12) United States Patent
Deguchi et al.

(10) Patent No.: US 6,546,323 B2
(45) Date of Patent: Apr. 8, 2003

(54) VEHICLE FRONT/REAR WHEEL STEERING ANGLE CONTROL APPARATUS AND VEHICLE FRONT/REAR WHEEL STEERING ANGLE CONTROL METHOD

(75) Inventors: Yoshitaka Deguchi, Yokohama (JP); Takeaki Obata, Yokohama (JP); Nobutaka Takahashi, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/956,868

(22) Filed: Sep. 21, 2001

(65) Prior Publication Data

US 2002/0035425 A1 Mar. 21, 2002

(30) Foreign Application Priority Data

Sep. 21, 2000 (JP) ........................................ 2000-287150

(51) Int. Cl.⁷ .................................................. B62D 5/00
(52) U.S. Cl. ........................... 701/41; 180/408; 180/411
(58) Field of Search .............................. 701/41; 180/204, 180/410, 411, 445, 415, 408

(56) References Cited

U.S. PATENT DOCUMENTS

| | | | | |
|---|---|---|---|---|
| 5,099,940 A | * | 3/1992 | Imaseki et al. | 180/415 |
| 5,184,298 A | * | 2/1993 | Imaseki et al. | 701/41 |
| 5,508,921 A | * | 4/1996 | Chikuma et al. | 701/41 |
| 5,718,304 A | * | 2/1998 | Lee | 180/415 |
| 6,345,218 B1 | * | 2/2002 | Yamanaka et al. | 701/41 |

* cited by examiner

Primary Examiner—Thomas G. Black
Assistant Examiner—Arthur D. Donnelly
(74) Attorney, Agent, or Firm—McDermott, Will & Emery

(57) ABSTRACT

A reference steering angle achieved when the steering operation quantity is sustained at a constant value is calculated in correspondence to the steering operation quantity. A decision is made as to whether the vehicle is in a turn-contracting state, in which the direction of a steering operation matches the direction of a change made in the steering operation or a turn-expanding state in which the direction of the steering operation is opposite from the direction of the change made in the steering operation. If the vehicle is determined to be in a turn-contracting state, the target steering angles for the front wheels and the rear wheels are calculated by correcting the reference steering angle so as to achieve a smaller steering center elevation angle. If, on the other hand, the vehicle is determined to be in a turn-expanding state, target steering angles for the front wheels and the rear wheels are calculated by correcting the reference steering angle so as to achieve a larger steering center elevation angle. The steering angles at the front wheels and the rear wheels are adjusted independently of one another so as to match the steering angles with the target steering angles thus calculated.

9 Claims, 15 Drawing Sheets

(VIEWED FROM ABOVE)

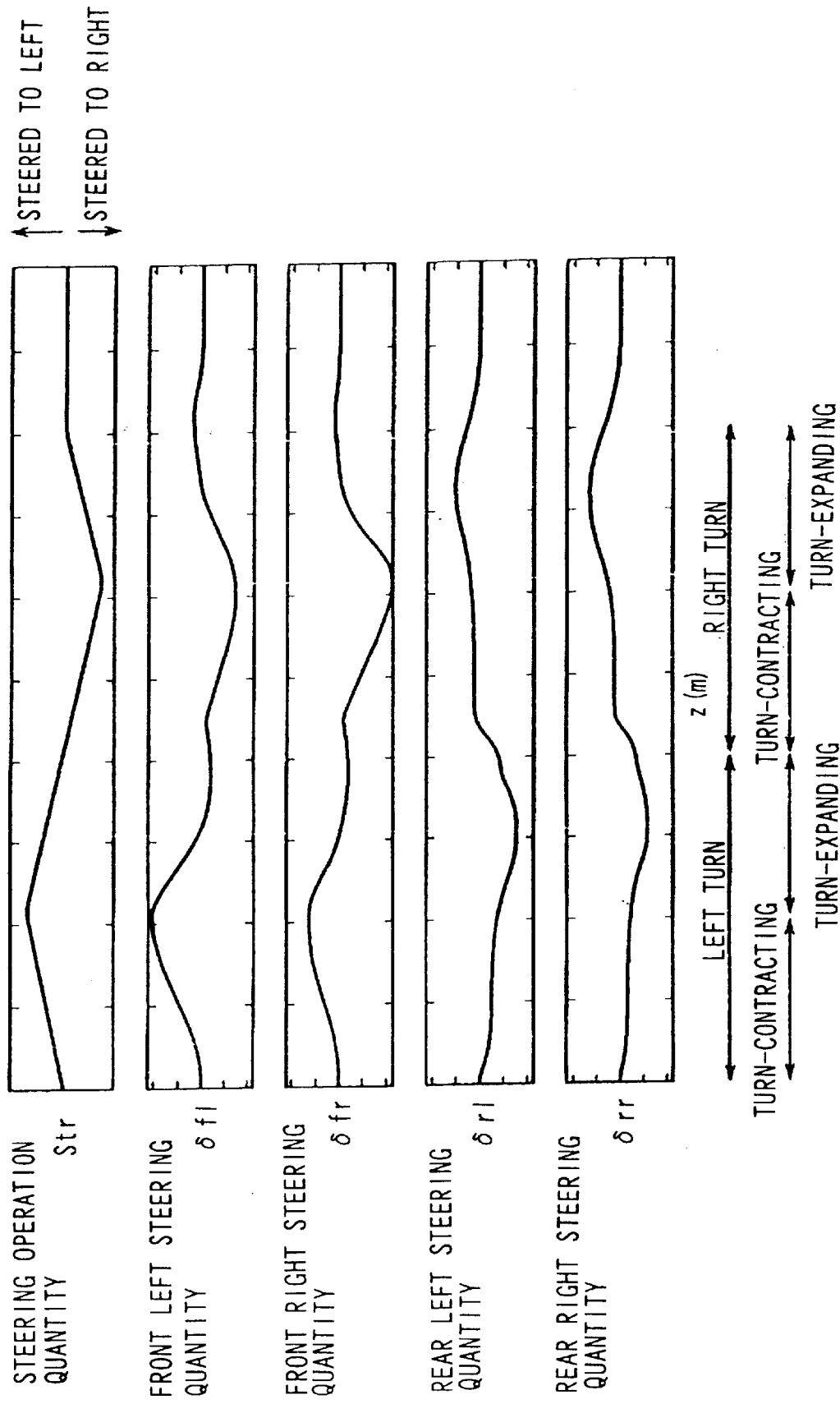

EXAMPLE 1

EXAMPLE 2

PRESENT INVENTION

BEHAVIOR DURING PARALLEL PARKING OPERATION

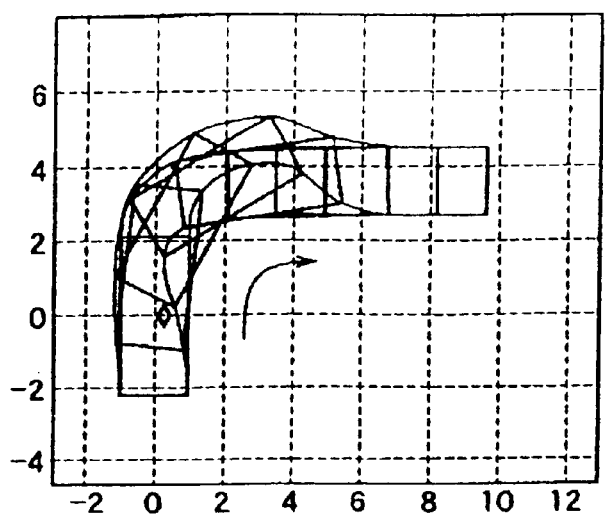
FIG.16A  EXAMPLE 1
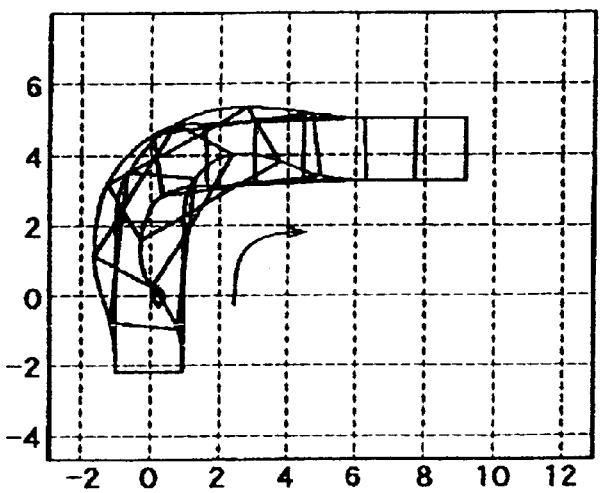
FIG.16B  EXAMPLE 2
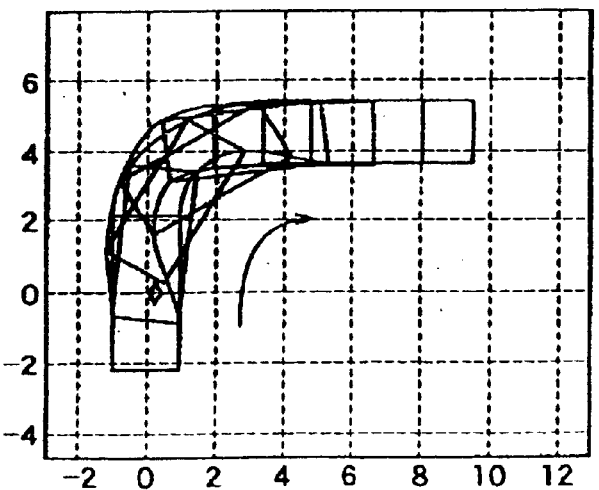
FIG.16C  PRESENT INVENTION
BEHAVIOR DURING VEHICLE TURN

EXAMPLE 1

EXAMPLE 2

PRESENT INVENTION

BEHAVIOR DURING VEHICLE TURN

VEHICLE FRONT/REAR WHEEL STEERING ANGLE CONTROL APPARATUS AND VEHICLE FRONT/REAR WHEEL STEERING ANGLE CONTROL METHOD

BACKGROUND OF THE INVENTION

1. Field of the Invention

The present invention relates to a vehicle front/rear wheel steering angle control apparatus and a vehicle front/rear wheel steering angle control method.

2. Description of the Related Art

A four-wheel vehicle is normally steered by adopting the front wheel steering method in which the front wheels alone can be steered. However, by adopting the front/rear wheel (four wheel) steering method in which the rear wheels can be steered as well, the minimum turning radius can be reduced and the cornering attitude while the vehicle is traveling at a medium to high speed can be stabilized to improve vehicle stability and the ease of driving.

The front/rear wheel steering method includes the mechanical transmission method achieved by mechanically linking the steering systems for the front wheels and the rear wheels and the method that enables adjustment of the front wheel steering and the rear wheel steering to be implemented independently of each other without mechanically linking the steering systems for the front and rear wheels to the steering wheel. In a vehicle with front/rear wheel steering angle control apparatus adopting the front/rear wheel steering method, the front and rear wheels may be steered to equal degrees in reverse phase relative to each other corresponding to the steering operation quantity in order to reduce the vehicle turning radius.

SUMMARY OF THE INVENTION

However, when parallel parking or turning a vehicle equipped with a front/rear wheel steering angle control apparatus in the related art while the vehicle is traveling forward, the vehicle manifests behavior in which part of the vehicle must be maneuvered toward the outside of the turn to a great degree. Following examples arises in countries in which the vehicle must keep to the left. FIGS. 15~17(*a*) and (*b*) present examples of the results of simulations of the behavior of the vehicle manifesting in the related art.

FIG. 15(*a*) presents an example of vehicular behavior manifesting when a vehicle in which the front wheels alone are steered (hereafter referred to as example 1) is parallel parked while it is traveling forward. In this situation, it is necessary to maneuver the vehicle to set the front left side of the vehicle outward to a great degree and thus, there arises a problem in that the vehicle cannot be set tightly at the side of the road (to the left) with ease during the parking operation.

FIGS. 16(*a*) and 17(*a*) present examples of vehicular behavior manifesting when the vehicle in example 1 is turned. As shown in the figures, when the vehicle is turned to the right, for instance, vehicular behavior manifests in which the front left side of the vehicle juts outward to a great degree. Thus, the driver must pay close attention to ensure that the front left side of the vehicle does not collide with an obstacle while turning the vehicle in a particularly narrow space.

FIG. 15(*b*) presents an example of vehicular behavior manifesting when a vehicle having the front wheels and the rear wheels steered to equal degrees in reverse phase in relation to each other (hereafter referred to as example 2) is parallel parked while it is advancing forward. During the initial stage of the parking procedure (when the vehicle is turned to the left in the figure), the rear right side of the vehicle juts out and thus, the driver must pay close attention to prevent the rear right side of the vehicle from colliding with an obstacle. At the final stage of the parking procedure (when the vehicle is turned to the right in the figure) during which the front left side of the vehicle juts out, a problem arises in that the vehicle cannot be maneuvered to the left with ease for parking.

FIGS. 16(*b*) and 17(*b*) present examples of vehicular behavior manifesting when the vehicle in example 2 is being turned. As shown in the figures, when the vehicle is turned to the right, for instance, a vehicular behavior manifests in which the front left side or the rear left side of the vehicle juts out to a great degree even during the initial stage of the turning operation. In particular, when turning the vehicle within a small space, the driver must pay close attention to ensure that the front left side and the rear left side of the vehicle do not collide with an obstacle.

An object of the present invention is to provide a vehicle front/rear wheel steering angle control apparatus and a vehicle front/rear wheel steering angle control method that allow a vehicle traveling forward to be parallel parked or to be turned in a smooth manner without any part of the vehicle allowed to jut out.

In the vehicle front/rear wheel steering angle control apparatus according to the present invention, which includes a steering angle control device that implements control on steering angles of front wheels and rear wheels independently of one another, a target steering angle calculating device that calculates target steering angles for the front and rear wheels and a steering angle adjustment device that adjusts the steering angles for the front and the rear of the vehicle so as to match the steering angles with the target steering angles calculated by the target steering angle calculating device, the target steering angle calculating device judges as to whether the vehicle is in a turn-contracting state, in which the direction along which a change made in the steering operation matches the direction of the steering operation or a turn-expanding state in which the direction along which the change is made in the steering operation is the opposite of the direction of the steering operation, calculates target steering angles for the front and rear wheels so as to allot a greater steering quantity for the front wheels compared to the rear wheels if it is decided that the vehicle is in a turn-contracting state and calculates target steering angles for the front and rear wheels so as to allot a greater steering quantity for the rear wheels compared to the front wheels if the vehicle is determined to be in a turn-expanding state.

The target steering angle calculating device may comprise a reference steering angle calculating device that calculates a reference steering angle achieved when the steering operation quantity is sustained at a constant value in correspondence the steering operation quantity, a steering operation intermediate quantity calculating device that calculates a steering operation intermediate quantity so as to gradually match the steering operation intermediate quantity with the quantity of the steering operation performed by the driver each time a specific fixed reference point on the vehicle shifts, a turn-contracting/turn-expanding judging device that judges as to whether the vehicle is in a turn-contracting state or a turn-expanding state based upon whether or not the direction of a steering operation corresponding to the steering operation intermediate quantity matches the direction of a change made in the steering operation and a reference steering angle correction device that obtains a target steering angle by correcting the reference steering angle so as to achieve a smaller steering center elevation angle compared to the steering center elevation angle achieved when the steering operation quantity is sustained at a constant value if it is decided by the turn-contracting/turn-expanding judging device that the direction of the steering operation corresponding to the steering operation intermediate quantity matches the direction of the change made therein and obtains a target steering angle by correcting the reference steering angle so as to achieve a larger steering center elevation angle if it is decided that the direction of the steering operation corresponding to the steering operation intermediate quantity is opposite from the direction of the change made therein.

In the vehicle front/rear wheel steering angle control method according to the present invention, which includes judging as to whether the vehicle is in a turn-contracting state in which the direction of a steering operation matches the direction of a change made in the steering operation or a turn-expanding state in which the direction of the steering operation is opposite from the direction of the change made therein, calculating target steering angles for front and rear wheels so as to allot a larger steering quantity to the front wheels compared to the rear wheels if the vehicle is determined to be in a turn-contracting state, calculating target steering angles for the front and rear wheels so as to allot a larger steering quantity to the rear wheels compared to the front wheels if the vehicle is determined to be in a turn-expanding state, and adjusting the steering angles at the front wheels and the rear wheels independently of one another so as to match the steering angles with the target steering angles that have been calculated.

BRIEF DESCRIPTION OF THE DRAWINGS

FIG. 14 shows changes occurring in quantities representing various statuses observed in a simulation of vehicular behavior of a vehicle equipped with the front/rear wheel steering angle control apparatus according to the present invention shown in FIG. 15(c);

FIG. 16 presents vehicle locus simulation diagrams illustrating vehicular behavior manifesting during a turn, with 16(a) illustrating the vehicular behavior manifesting in example 1 (front wheel steering), FIG. 16(b) illustrating the vehicular behavior manifesting in example 2 (front and rear wheels steered to equal degrees in reverse phase relative to each other) and FIG. 16(c) illustrating the vehicular behavior manifesting in an embodiment of the present invention.

DETAILED DESCRIPTION OF THE PREFERRED EMBODIMENTS

Figure 12:
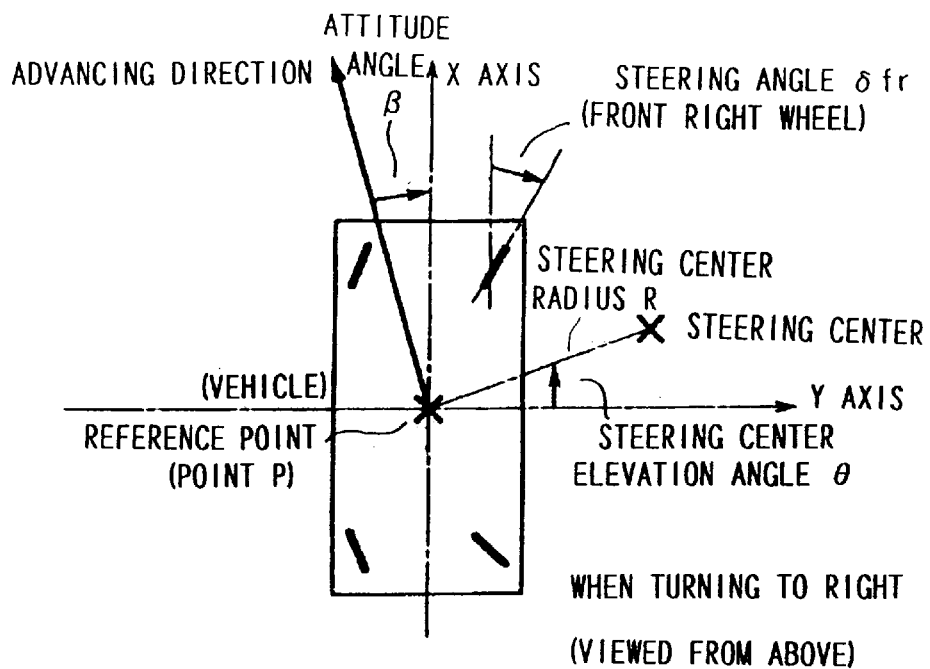
FIG. 12 illustrates the definitions of the terms used in the description of the present invention.

First, the definitions of the terms used in this specification are clarified by referring to FIG. 12.

Vehicle reference point (P): an arbitrary fixed point on the vehicle. The point at which the line segment connecting the point at which the front axle is divided into two equal portions and the point at which the rear axle is divided into two equal portions is divided into two equal portions is normally selected as the reference point. The center of gravity of the vehicle may be used as the reference point, instead.

Vehicle fixed coordinates: a coordinate system having the origin point, the x axis and the y axis fixed in correspondence to the particulars of the vehicle. In the following explanation, the reference point P on the vehicle represents the origin point, the x axis represents the forward direction relative to the vehicle and the y axis represents the lateral direction relative to the vehicle, as illustrated in FIG. 12. When the vehicle is turning, the y axis assumes positive values along the direction of the turn. Since the vehicle is turned to the right in FIG. 12, positive values are taken along the right side of the vehicle. When the vehicle is turned to the left, however, positive values are taken along the left side of the vehicle.

Attitude angle: an angle β formed by the direction along which the reference point P on the vehicle advances and the vehicle frontward direction (the x axis in FIG. 12) , with the positive range representing the orientation of the turn made by the vehicle. Since the vehicle is turned to the right in FIG. 12, the positive range represents the right turn (the clockwise direction). During a left turn, the positive range represents the left turn (the counter-clockwise direction)

Steering angle: the angle formed by the x axis and a wheel ($\delta fr$, $\delta fl$, $\delta rl$ and $\delta rr$ in the figure respectively indicate the steering angles of the front right wheel, the front left wheel, the rear left wheel and the rear right wheel) in FIG. 12.

Steering center: the point on the vehicle fixed coordinate system that represents the center of the turn when the vehicle is turned while the front and rear wheel steering angles remain constant Steering center radius R: the distance between the reference point P on the vehicle and the steering center.

Steering center elevation angle θ: the angle formed by the line connecting the reference point P on the vehicle and the steering center and the line extending from the reference point P on the vehicle along the lateral direction of the vehicle (parallel to the y axis). Angles of rotation along the direction in which the vehicle advances are represented over the positive range (when the vehicle is turned to the right, the counter clockwise direction matches the positive direction, whereas when the vehicle is turned to the left, the clockwise direction matches the positive direction.

Turn-contracting: an instance of changing the steering operation quantity so as to reduce the vehicle turning radius. When the steering wheel is already turned to the right, turn-contracting is achieved by turning the steering wheel further to the right. When the steering wheel is already turned to the left, turn-contracting is achieved by turning the steering wheel further to the left.

Turn-expanding: an instance of changing the steering operation quantity so as to increase the vehicle turning radius. When the steering wheel is already turned to the right, turn-expanding is achieved by turning the steering wheel partially back to the left. When the steering wheel is already turned to the left, turn-expanding is achieved by turning the steering wheel partially back to the right.

First Embodiment

Figure 1:
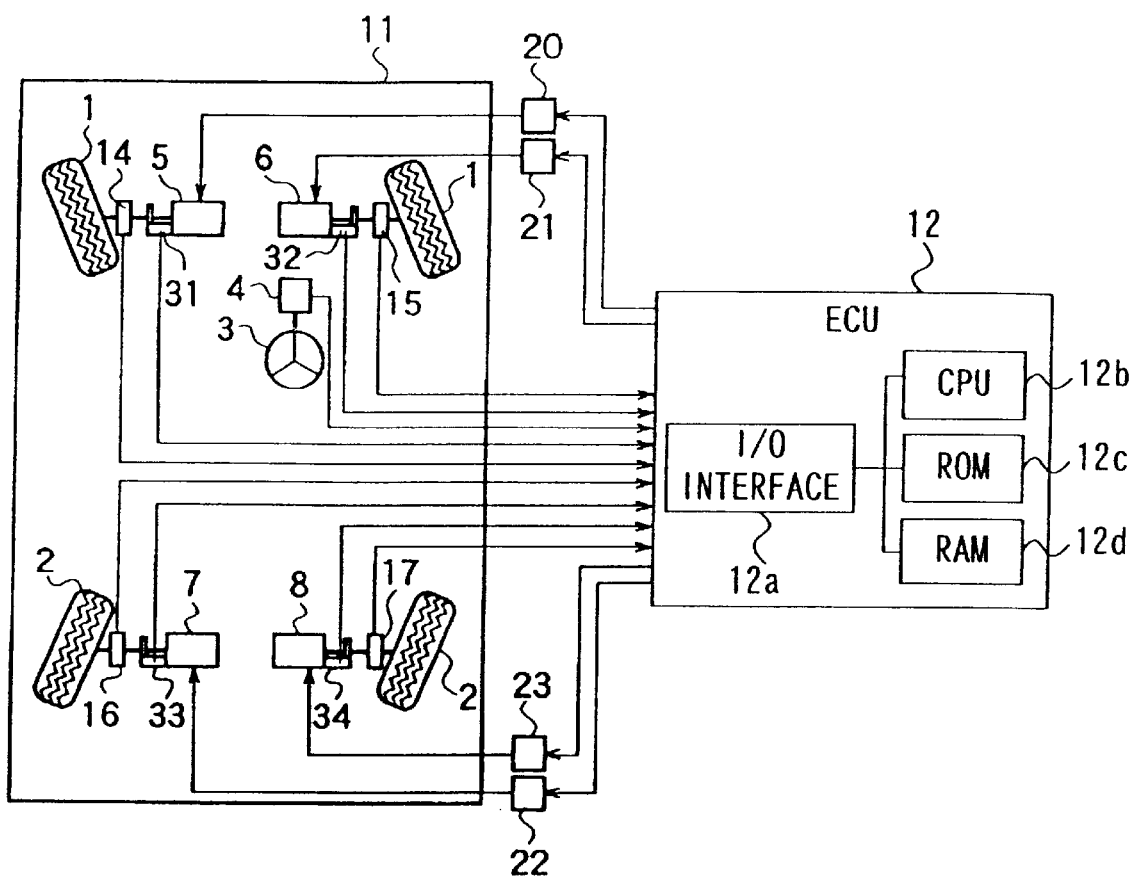
FIG. 1 is a system configuration diagram illustrating a vehicle adopting the vehicle front/rear wheel steering angle control apparatus according to the present invention in a first embodiment.

FIG. 1 illustrates the structure of a vehicle that adopts the first embodiment of the front/rear wheel steering angel control apparatus according to the present invention. In FIG. 1, a vehicle 11 includes front wheels 1, rear wheels 2, a steering wheel 3 that is operated by the driver and a steering angle sensor 4 that detects the steering angle of the steering wheel 3. The steering angle sensor 4 detects the degree to which the steering column shaft is rotated by utilizing, for instance, an encoder type sensor and provides the detection value to a control circuit (hereafter referred to as an ECU) 12.

Wheel steering actuators 5 and 6 provided to steer the front wheels 1 and rear wheel steering actuators 7 and 8 provided to steer the rear wheels 2, each having a DC motor, adjust the steering angles of the front and rear wheels at the left and the right independently of one another. A steering angle is adjusted by converting the rotating motion of the DC motor to a lateral motion of a steering rack via a worm gear and adjusting the distance over which the steering rack travels. Motors other than DC motors may be used. For instance, induction motors or switched reluctance motors may be employed, or linear motors that allow the distances over which the steering racks travel to be directly adjusted may be used.

Drive circuits 20, 21, 22 and 23 respectively implement drive control on the steering actuators 5, 6, 7 and 8 in conformance to steering angle command values provided by the ECU 12, to drive the motors for steering the individual wheels. The drive circuits 20, 21, 22 and 23, each constituted of an H bridge, which is ideal for achieving reversible rotation rate control on a motor, implement a DC motor current feedback. Thus, the motor currents can be controlled as commanded by the ECU 12, as detailed later.

Potentio-type rack stroke sensors 31, 32, 33 and 34 respectively detect the steering rack traveling distances corresponding to the front and rear wheels at the left and the right. Vehicle speed sensors 14, 15, 16 and 17 detect the rotating speeds of the individual wheels of the vehicle 11. The vehicle speed sensors 14~17 may each be constituted of a Hall IC type sensor that outputs a pulse when a wheel shifts its position from a groove to a tooth as a gear mounted at the rotating shaft of the wheel rotates.

The ECU 12, provided with a control circuit the main component of which is a microcomputer having an I/O interface 12a, a CPU 12b, a ROM 12c and a RAM 12d engages in signal exchange with an external device and various arithmetic operations. The I/O interface 12a is provided to input information from the external sensors and the like and output a signal for driving the external actuators. The CPU 12b executes the arithmetic operations and the ROM 12c stores therein a control program, various types of data and the like to be explained later. The RAM 12d is used to temporarily store information during a program execution. It is to be noted that the ECU 12 also includes a timer and the like for measuring the lengths of pulse intervals detected by the vehicle speed sensors 14~17.

Figure 2:
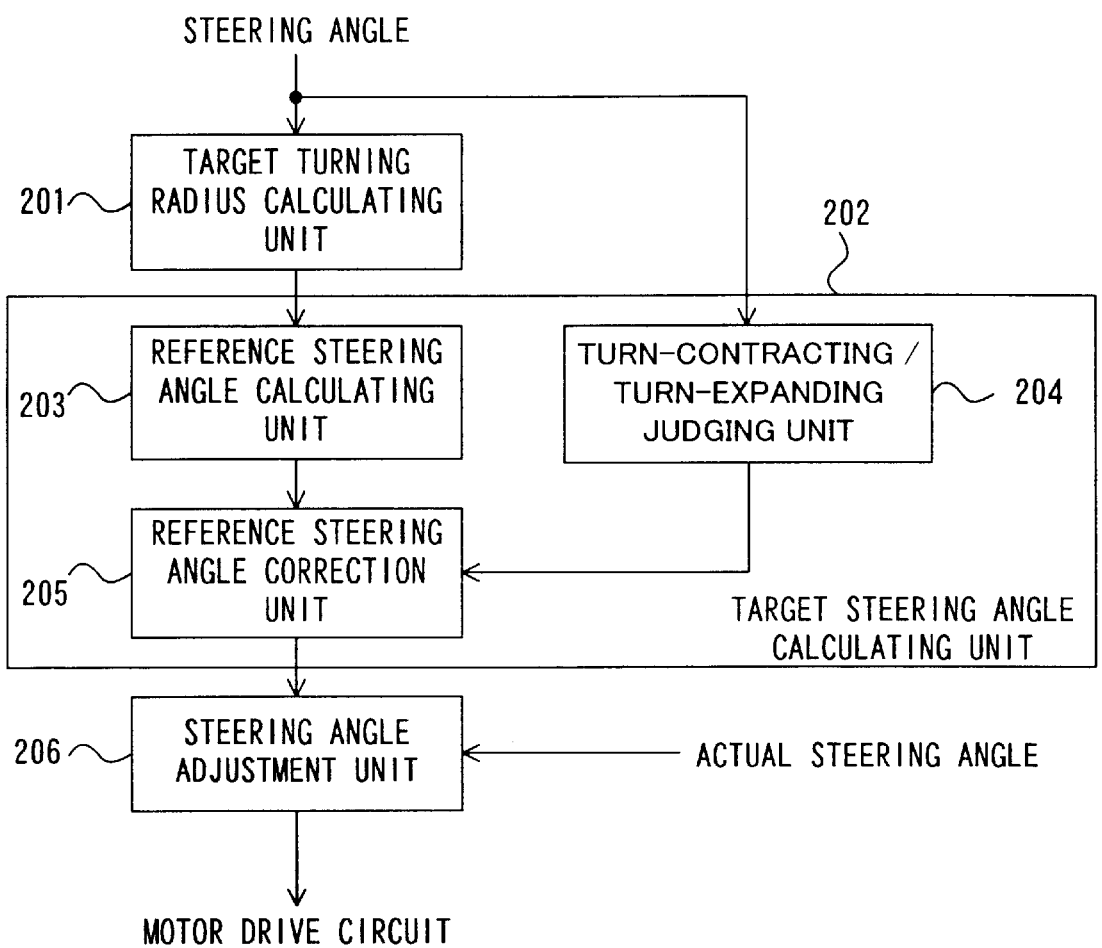
FIG. 2 is a block diagram illustrating the vehicle front/rear wheel steering angle control apparatus in the first embodiment.

FIG. 2 is a block diagram provided to facilitate an explanation of the various functions realized in software by the ECU 12. Namely, the ECU 12 is provided with a target turning radius calculating unit 201, a target steering angle calculating unit 202 and a steering angle adjustment unit 206. The target turning radius calculating unit 201 calculates a target turning radius Re to be achieved when the steering operation quantity ST is sustained at a constant level, based upon the steering angle (rotational angle detection value) ST representing the quantity of a steering operation performed by the driver.

Figure 3:
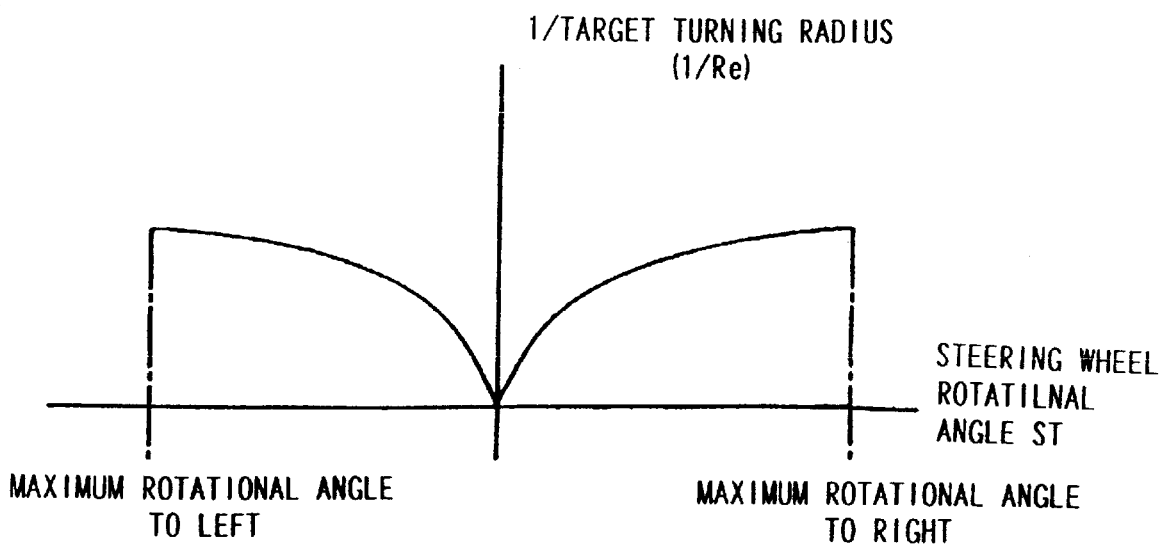
FIG. 3 illustrates the relationship between the steering quantity (rotational angle) and the target turning radius.

FIG. 3 presents an example of the relationship between the rotational angle ST of the steering wheel 3 and the reciprocal of the target turning radius Re. The data indicating the relationship as shown in FIG. 3 are stored in advance in the ROM as a look-up table. The target turning radius Re is calculated by referencing this look-up table.

It is to be noted that the reciprocal of the target turning radius Re is used as shown in FIG. 3, since the turning radius manifesting when the vehicle is advancing straight ahead, i.e., when the rotational angle of the steering wheel 3 is 0, is infinite. The target turning radius may be calculated based upon the vehicle speed or the like instead of the rotational angle of the steering wheel. This arithmetic operation is performed every 10 ms and thus, the target turning radius Re is output every 10 ms.

In order to calculate the target steering angles for the individual rotating shafts, the target steering angle calculating unit 202 first calculates a target steering center elevation angle θ and then ascertains a target steering center (a point Q) which will achieve the target turning radius Re and the target steering center elevation angle θ. Next, the target steering angle calculating unit 202 calculates the target steering angle (the front left wheel $\delta fl^*$, the front right wheel $\delta fr^*$, the rear left wheel $\delta rl^*$ and the rear right wheel $\delta rr^*$) for the individual shafts required to achieve the target steering center thus ascertained. To enable these arithmetic operations, the target steering angle calculating unit 202 is provided with a reference steering angle calculating unit 203, a turn-contracting/turn-expanding judging unit 204 and a reference steering angle correction unit 205. The reference steering angle calculating unit 203 calculates a reference steering angle manifesting when the steering operation quantity is sustained at a constant value based upon the target turning radius Re. The turn-contracting/turn-expanding judging unit 204 judges as to whether the vehicle is in a turn-contracting state or a turn-expanding state based upon the change in the steering angle representing the quantity of the steering operation performed by the driver. The reference steering angle correction unit 205 corrects the reference steering angle in correspondence to the turn-contracting/turn-expanding state of the steering operation ascertained by the turn-contracting/turn-expanding judging unit 204. In a turn-contracting state, a target steering angle is set by correcting the reference steering angle so as to reduce the steering center elevation angle θ. In a turn-expanding state, a target steering angle is set by correcting the reference steering angle so as to increase the steering center elevation angle θ. The steering angle adjustment unit 206 adjusts the actual steering angle to match the actual steering angle with the target steering angle calculated by the target steering angle calculating unit 202.

The following is a step-by-step explanation of a calculation method that may be adopted during this process. It is to be noted that since the calculation is performed in a similar manner regardless of where on the vehicle the reference point P is set, the following explanation is given on the assumption that the reference point P is set at the center of the vehicle (at the point dividing the line connecting the centers of the front wheel track and the rear wheel track into two equal portions).

Figure 4:
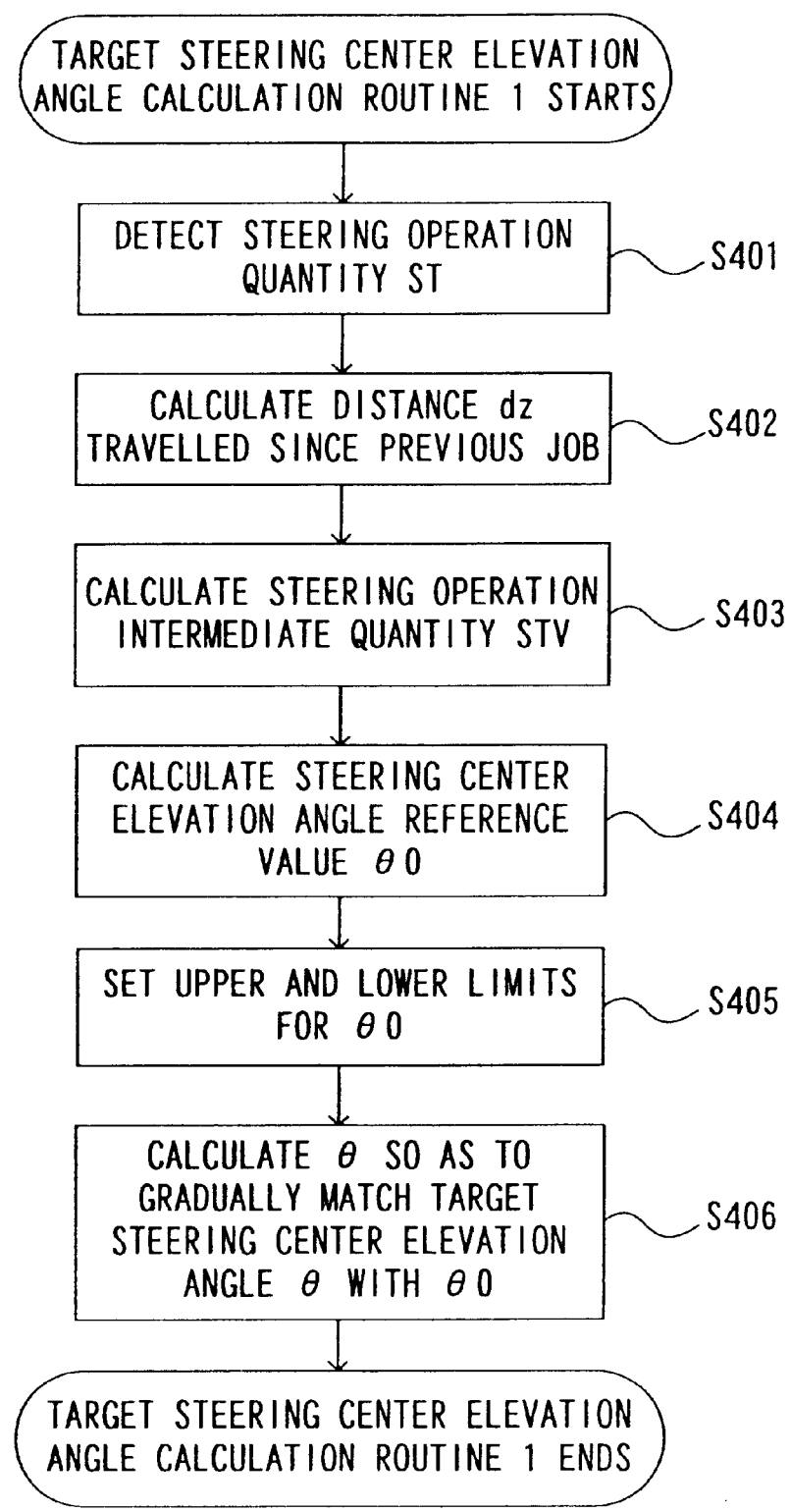
FIG. 4 presents a flowchart 1 of the procedure through which the target steering center elevation angle is calculated.
Figure 5:
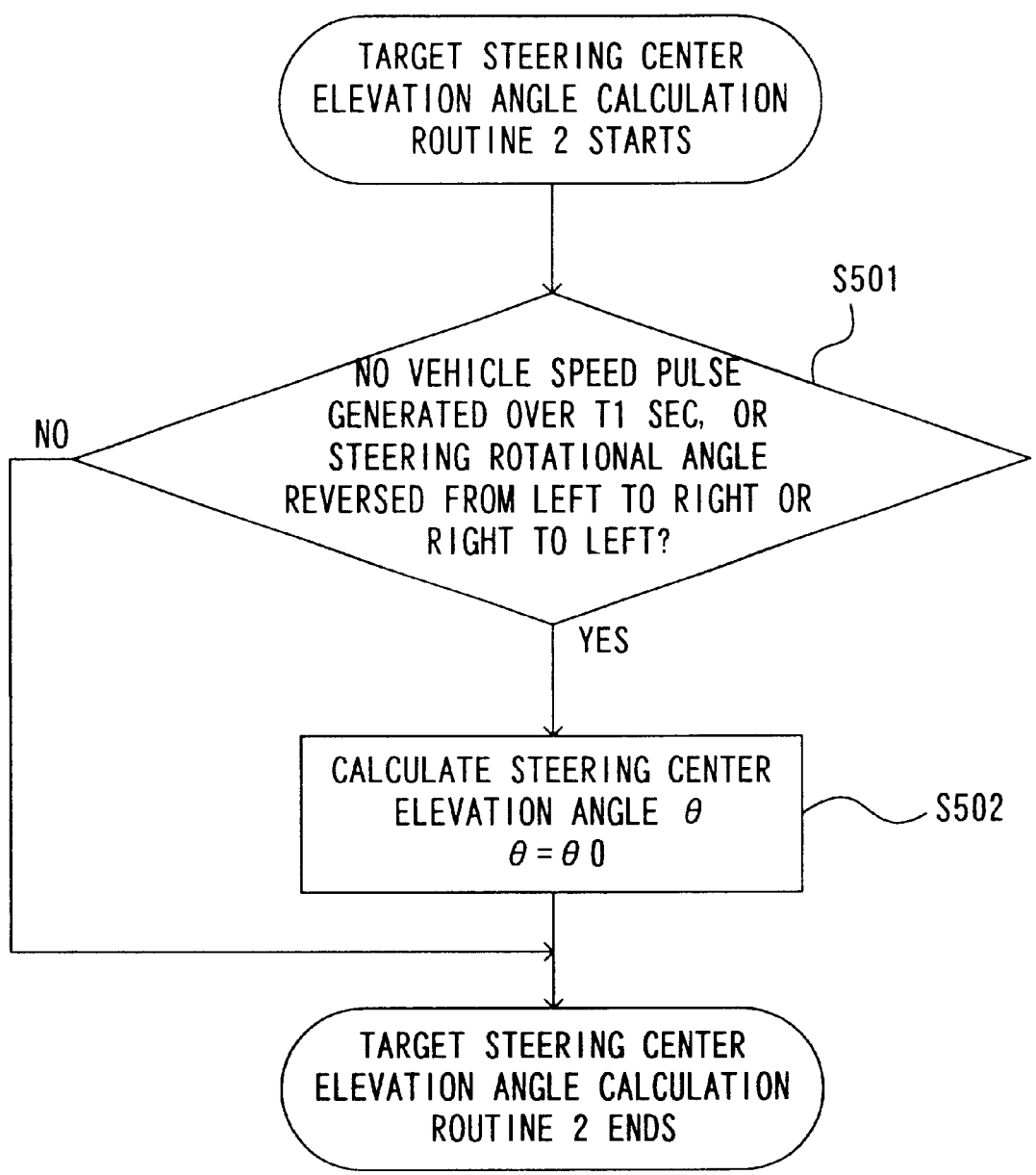
FIG. 5 presents a flowchart 2 of the procedure through which the target steering center elevation angle is calculated.

First, the method adopted to calculate the target steering center elevation angle θ is explained in reference to the flow charts presented in FIGS. 4 and 5. Through the procedure shown in FIG. 4, the target steering center elevation angle θ to be achieved when the vehicle turning direction is constant is calculated. Through the procedure in the flowchart shown in FIG. 5, the target steering center elevation angle θ to be achieved when the vehicle turning direction changes or when the vehicle is virtually in a stationary state.

The following is a step-by-step explanation of the procedure in the flowchart in FIG. 4, starting with the processing performed in step S401. During the processing starting in step S401, an arithmetic operation is executed in synchronization with a rise of a pulse from the wheel speed sensor 15 corresponding to the front right wheel when the vehicle is turning to the left and an arithmetic operation is executed in synchronization with a rise of a pulse provided by the wheel speed sensor 14 corresponding to the front left wheel when the vehicle is turning to the right or the vehicle is advancing almost straight ahead. In step S401, the quantity ST of the steering operation performed by the driver is detected. The steering operation quantity ST is detected by the ECU 12 by counting the number of encoder pulses output from the steering angle sensor 4 in correspondence to the degree to which the steering wheel 3 is rotated.

In step S402, a distance dz over which the reference point P has advanced during the period from the previous job to the current job is calculated. The previous job refers to the execution immediately preceding the current execution, of the processing shown in the flowchart in FIG. 4 which is executed repeatedly. In order to ascertain the distance z over which the reference point P has moved, the distances over which the individual wheels have traveled are calculated in advance.

The distances over which the individual wheels have traveled are calculated by performing time integration on the traveling speeds of the wheels that are ascertained by dividing the vehicle traveling distance per pulse with the lengths of the intervals between pulses provided by the vehicle speed sensors 14, 15, 16 and 17.

Four vehicle speed sensors 14, 15, 16 and 17 are mounted at the wheel shafts. Since the reference point P is set at the middle point from the four wheels, the distance z over which the reference point P has moved since the start of the processing in the flowchart in FIG. 4 up to the current time point is ascertained through a simplified arithmetic operation as the average of the traveling distances calculated based upon the outputs from the individual vehicle speed sensors 14, 15, 16 and 17. The distance dz over which the vehicle has advanced during the span of one job is calculated through formula (1) by using the current distance zc over which the reference position P has advanced thus ascertained and the distance zold over which the reference point P had advanced up to the time point of the previous job.

$$dz = zc - zold \tag{1}$$

It is to be noted that the arithmetic operation which uses formula (1) does not need to be performed if the reference point P is set at the position of the wheel speed sensor for the front right wheel when the vehicle is turning to the left and if the reference point P is set at the position of the wheel speed sensor for the front left wheel when the vehicle is turning to the right or is traveling almost straight ahead, since the value of dz corresponds to a distance which is predetermined in conformance to the interval over which pulses are generated.

In step S403, a steering operation intermediate quantity STV is calculated. The steering operation intermediate quantity STV is a parameter adopted to gradually change the steering center elevation angle θ. In order to calculate the steering operation intermediate quantity STV, an increase rate limit dSTVi and a decrease rate limit dSTVd for STV must be ascertained first. Increase rate limits and decrease rate limits for the steering operation intermediate quantity STV per unit reference point traveling distance are stored in the ROM in correspondence to varying target turning radii Re. By looking up these correlating data, the increase rate limit dSTVi and the decrease rate limit dSTVd can be ascertained.

The steering operation intermediate quantity STV is calculated so as to match the steering operation quantity ST by allowing it to vary within the variance range of dSTVi×dz~dSTVd×dz.

In step S404, a steering center elevation angle reference value θ0 which is needed to ascertain the target steering center elevation angle θ is calculated. First, the difference dSTV between the current steering operation intermediate quantity STV and the steering operation intermediate quantity STVz corresponding to the previous job immediately preceding the current job is calculated.

$$dSTV = STV - STVz \tag{2}$$

If dSTV thus calculated is a positive value, the steering operation quantity indicates a turn-contracting state, whereas if dSTV is a negative value, the steering operation quantity indicates a turn-expanding state. This processing is performed by the turn-contracting/turn-expanding judging unit 204 shown in FIG. 2.

Figure 8:
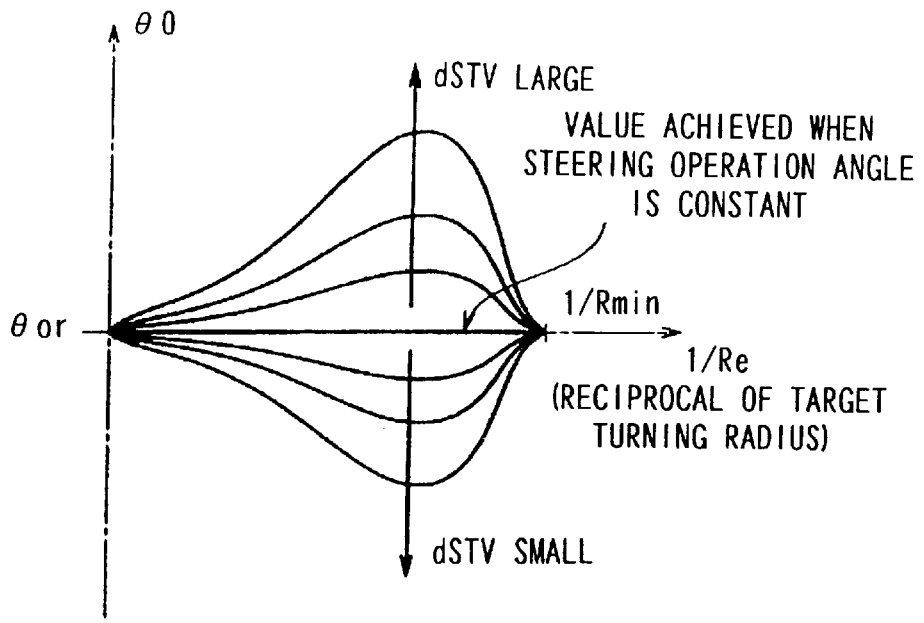
FIG. 8 illustrates the relationship between the target turning radius Re and the steering center elevation angle reference value θ0.

Next, a table of correlating data which are made to correspond to each other in advance is referenced by using the dSTV value as a parameter to determine the steering center elevation angle reference value θ0 corresponding to the target turning radius Re calculated based upon the steering operation quantity ST. This processing is performed by the reference steering angle calculating unit 203 shown in FIG. 2. FIG. 8 illustrates the relationship between the reciprocal of the target turning radius Re and the steering center elevation angle reference value θ0. The steering center elevation angle reference value θ0 is corrected so that the value increases when dSTV is a positive value and so that the value decreases when dSTV is a negative value, relative to the value θ0r achieved when the steering operation quantity (angle) is constant (dSTV=0). This processing is performed by the reference steering angle correction unit 205 shown in FIG. 2.

Once the steering center elevation angle reference value θ0 is calculated, the operation proceeds to step S405. In step S405, a limit is imposed on the steering center elevation angle reference value θ0 in correspondence to the target turning radius Re so as to ensure that the steering center elevation angle reference value θ0 does not deviate outside the range shown in FIG. 9. The data indicating the upper limit and the lower limit for θ0 corresponding to Re are obtained in advance and stored in the ROM. By looking up these data, the upper and lower limits for θ0 are determined to impose a limit on θ0 by using the values of the limits.

Figure 9:
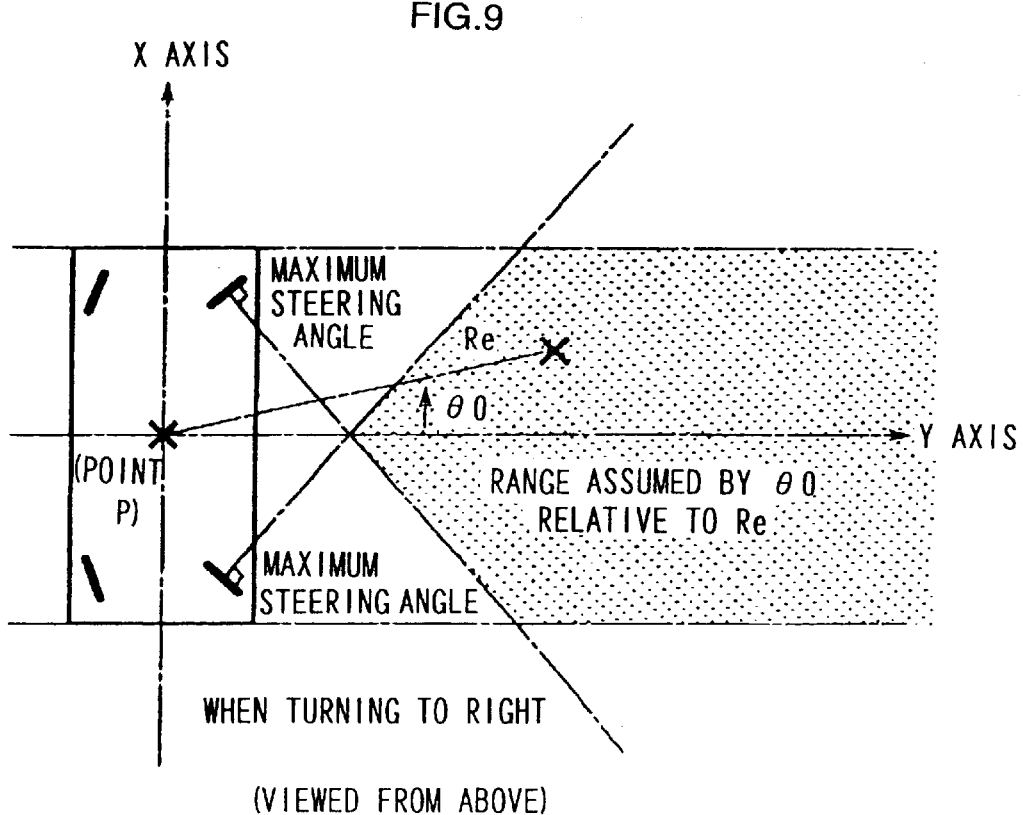
FIG. 9 shows the range that may be assumed by the steering center elevation angle reference value θ0 relative to the target turning radius Re.

Now the reason for imposing a limit on the steering center so as to ensure that the steering center is set between the line extending from the front end of the vehicle and the line extending from the rear end of the vehicle as shown in FIG. 9 is explained. When the vehicle is turned, the degree to which the rear end of the vehicle juts out toward the outside of the turn can be set to 0 by assuming the steering center on the line extending from the rear end of the vehicle. In addition, by assuming the steering center on the line extending from the front end of the vehicle, the degree to which the front end of the vehicle juts out toward the outside of the turn can be set to 0. Thus, by imposing a limit on the steering center so as to set the steering center within the range shown in FIG. 9, the vehicle can be effectively prevented from jutting out in any direction.

Then, the operation proceeds to step S406. In step S406, the target steering center elevation angle θ is calculated so as to gradually match the target steering center elevation angle θ with the steering center elevation angle reference value θ0. In order to perform this arithmetic operation, an increase rate limit dθi and a decrease rate limit dθd for the target steering center elevation angle θ are ascertained as described below.

The limits for the rate at which the target steering center elevation angle θ changes per unit advancing distance of the reference point P are made to correspond to, for instance, the target turning radius Re. The increase rate limit dθi and the decrease rate limit dθd are ascertained by looking up the correlating data.

The target steering center elevation angle θ is calculated so as to match the target steering center elevation angle θ with the steering center elevation angle reference value θ0. It is necessary for variant amount of the target steering center elevation angle θ to be within the variance range of dθixdz~dθdxdz. It is to be noted that the steering center elevation angle θ may match the steering center elevation angle reference value θ0 through control implemented based upon the first-order lag characteristics or the second-order lag characteristics, instead.

Through the processing in the flowchart shown in FIG. 4, the steering center elevation angle is corrected in correspondence to the vehicle traveling distance even when the driver operates the steering wheel while the vehicle is in a stationary state and then the vehicle travels at a fixed steering quantity. As a result, the vehicle is allowed to move in a smooth manner by minimizing the degree to which any part of the vehicle juts out during a vehicle turning operation or a parallel parking operation.

Unless the steering center elevation angle θ is allowed to gradually match the steering center elevation angle reference value θ0 by using the steering operation intermediate quantity STV, the following problem arises. When the steering wheel is turned to the right while turning the vehicle to the right and then the steering wheel is turned back to the left immediately afterward, the steering center is calculated so as to shift the steering center elevation angle from the rear to the front of the vehicle. In addition., if the steering wheel is turned back to the left while turning the vehicle to the right and the steering wheel is then turned to the right immediately afterward, the steering center is calculated so as to shift the steering center elevation angle from the front to the rear of the vehicle. As a result, a problem occurs in that when the quantity of change in the steering operation is drastically changed as described above, the steering center is calculated to change the steering center elevation angle drastically as well, to result in a sudden and significant change in the attitude angle β of the travelling vehicle.

Through the control implemented as shown in the flowchart in FIG. 4, the front and rear wheels are steered so as to gradually change the steering center elevation angle, and thus, the attitude angle β of the travelling vehicle is prevented from undergoing a drastic change. It is to be noted that research conducted by the inventor of the present invention et al. has revealed that the steering center elevation angle θ roughly matches the attitude angle β of the vehicle.

Now, in reference to FIG. 5, a target steering center elevation angle calculation routine 2 is explained. In the processing shown in this flowchart, the target steering center elevation angle θ to be achieved when the vehicle turning direction changes or when the vehicle is practically in a stationary state is calculated as explained earlier. This arithmetic operation is performed every 10 ms.

In step S501, a decision is made as to whether or not a vehicle speed pulse has been generated over a predetermined length of time (T1). T1 represents the interval over which pulses are generated when the vehicle is traveling at a speed of 1 km/h. If it is decided that no vehicle speed pulse has been generated over the predetermined period of time, the operation proceeds to step S502. In addition, if it is detected in step S501 that the turning center at the vehicle has shifted from right to left or from left to right based upon the quantity of the steering operation performed by the driver, the operation also proceeds to step S502. If neither of the above is the case, i.e., if a vehicle speed pulse has been generated during the predetermined period T1 and the turning center has not changed, the routine ends.

In step 5502, θ0 is set for the target steering center elevation angle θ for substitution before ending the routine.

Figure 6:
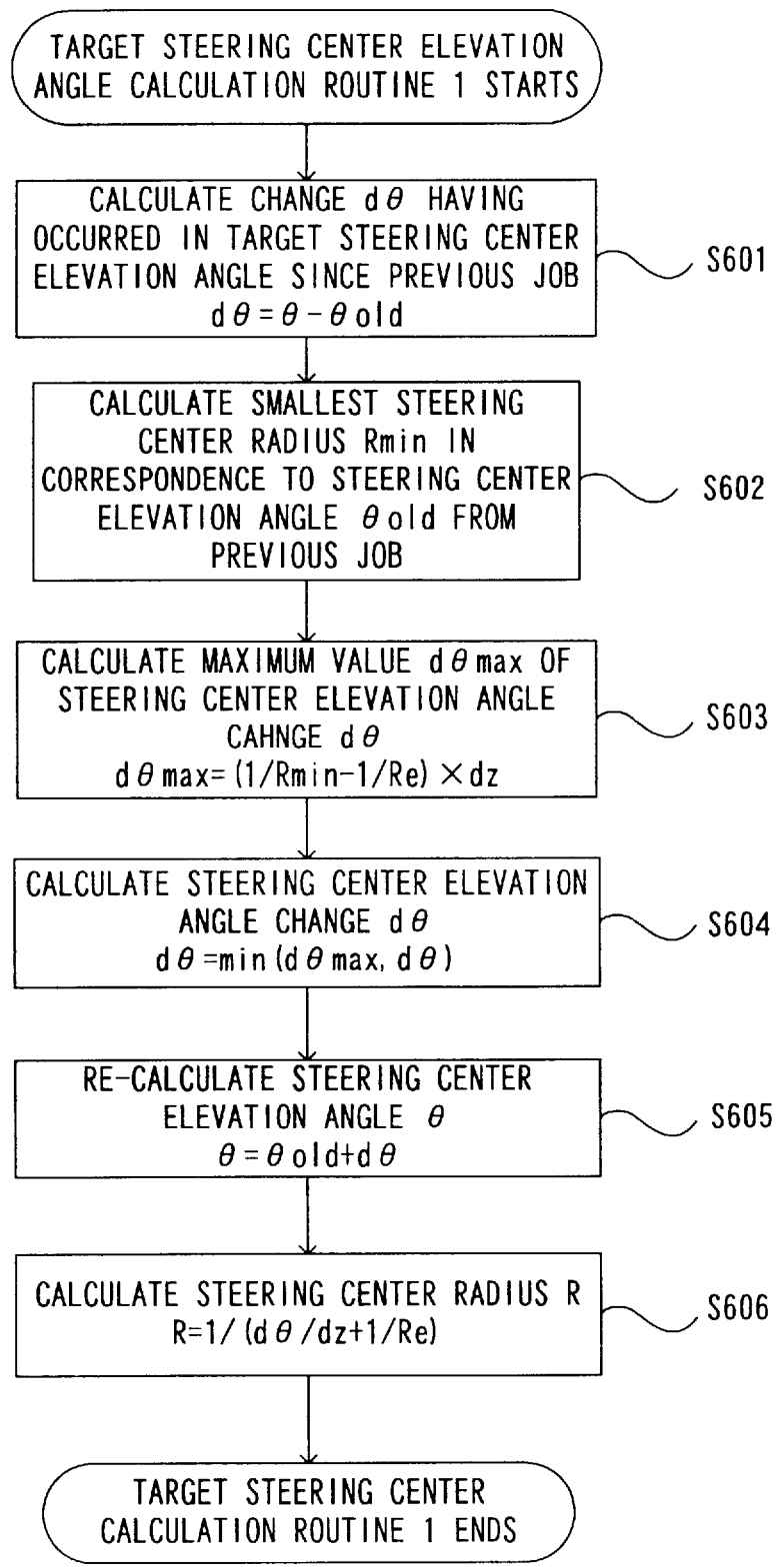
FIG. 6 presents a flowchart 1 of the procedure through which the target steering center is calculated.
Figure 7:
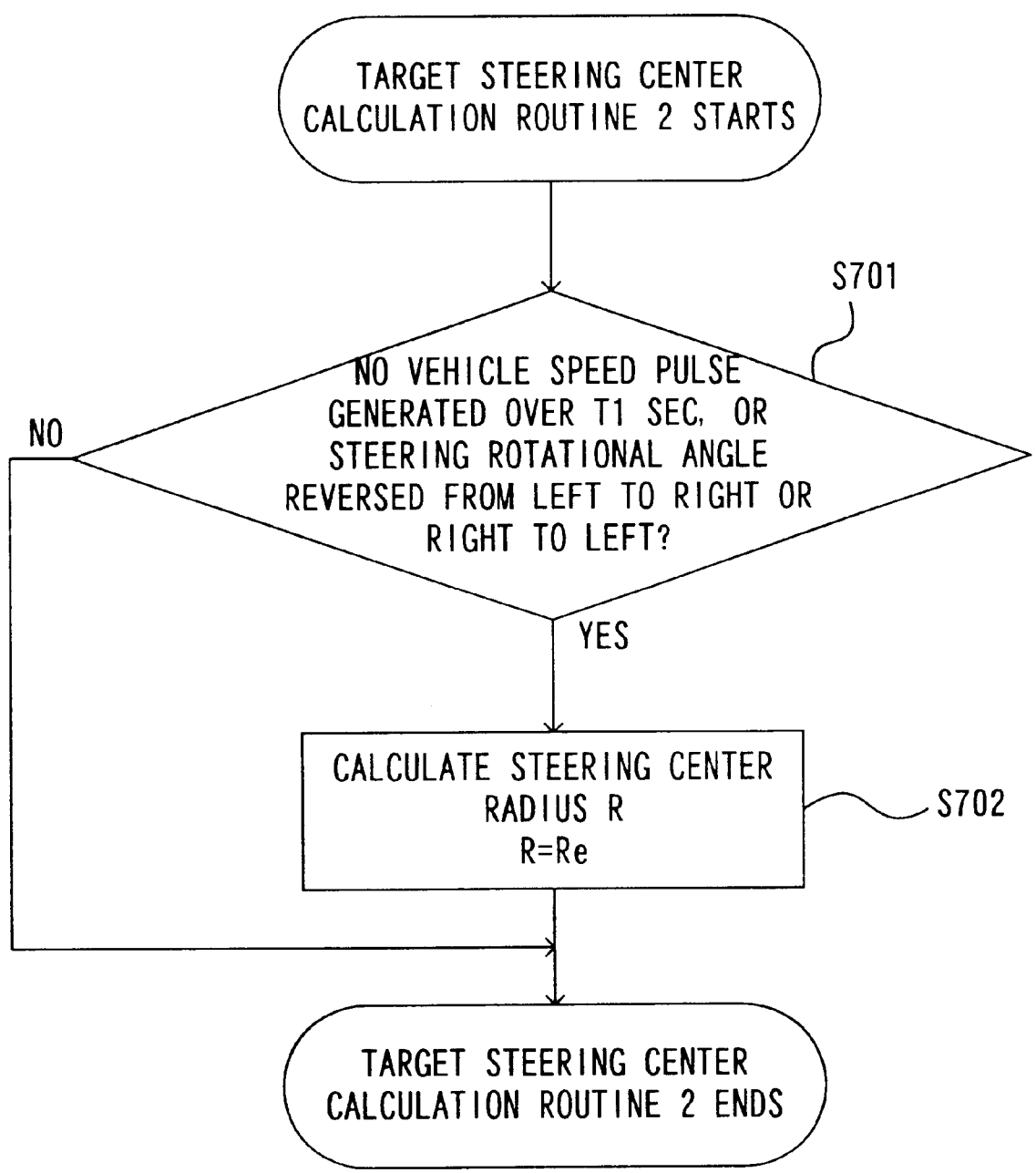
FIG. 7 presents a flowchart 2 of the procedure through which the target steering center is calculated.

Next, an example of how the steering center radius R and the steering center elevation angle θ may be calculated to specifically determine the target steering center (the point Q) is explained in reference to flowchart 1 and flowchart 2 presented in FIGS. 6 and 7 respectively. Through the processing shown in the flowchart in FIG. 6, the steering center to be achieved when the vehicle is moving without changing the turning direction is calculated. Through the processing shown in the flowchart in FIG. 7, the steering center to be achieved when the turning direction changes or when the vehicle is practically in a stationary state is calculated.

The following is a step-by-step explanation of the processing which starts in step S601 in FIG. 6. During the control which starts in step S601, an arithmetic operation is executed in synchronization with the rise of a pulse from the wheel speed sensor 15 for the front right wheel when the vehicle is turning to the left, and an arithmetic operation is executed in synchronization with the rise of a pulse from the wheel speed sensor 14 for the front left wheel when the vehicle is turning to the right or when the vehicle is advancing almost straight ahead.

In step S601, a value dθ representing the change having occurred in the target steering center elevation angle during the period of time spanning the previous job and the current job is ascertained based upon the most recent target steering center elevation angle θc and the target steering center elevation angle θold corresponding to the previous job through formula (3).

$$d\theta = \theta c - \theta old \quad (3)$$

Figure 13:
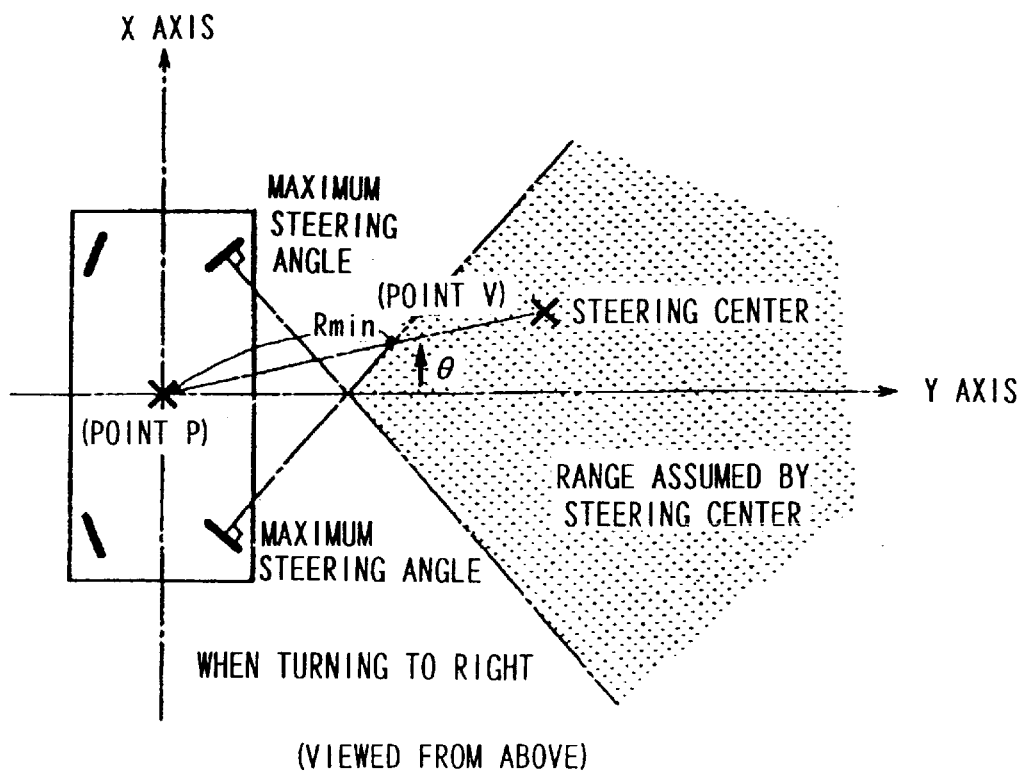
FIG. 13 shows the range of the steering center.

When dθ is ascertained, the operation proceeds to step S602. Instep S602, the smallest steering center radius Rmin that can be achieved in correspondence to the steering center elevation angle θold set for the previous job is calculated. In order to enable the arithmetic operation to calculate Rmin, values that may be assumed for Rmin in correspondence to various values of θ are measured in advance through testing and are stored in the ROM as table data. By looking up this table, Rmin can be ascertained. In FIG. 13, Rmin represents the distance between a point V and the point P.

Once Rmin is calculated, the operation proceeds to step S603. In step S603, a maximum value dθmax for the change dθ in the steering center elevation angle that will achieve the target turning radius Re is calculated by taking into consideration the smallest value Rmin of the steering center radius through following formula (4).

$$d\theta max = (1/Rmin - 1/Re) \times dz \quad (4)$$

When dθmax is calculated, the operation proceeds to step S604. In step S604, dθ is set to dθmax if the change do in the steering center elevation angle calculated in step S601 exceeds dθmax. In other words, dθ is set to either dθ or dθmax, whichever indicates the smaller value.

In the following step S605, the steering center elevation angle θ is calculated in correspondence to the value representing the change dθ in the steering center elevation angle through formula (5).

$$\theta = \theta old + d\theta \quad (5)$$

When the steering center elevation angle θ is calculated, the operation proceeds to step S606. The steering center radius R is calculated through formula (6) in step S606, and then the routine ends.

$$R = 1/(d\theta/dz + 1/Re) \quad (6)$$

When calculating the steering center radius R through formula (6), R that cannot be achieved practically may be obtained through the arithmetic calculation depending upon the values of the turning radius Re and dθ/dz. In such a case, a problem occurs in that the turning radius that reflects the quantity of the steering operation performed by the driver cannot be achieved. Accordingly, the control device in the embodiment addresses this problem by imposing a limit on the value of dθ/dz in step S604 to calculate the steering center radius R within an achievable range.

FIG. 7 presents a flowchart of the procedure through which the steering center is calculated when the turning direction changes or when the vehicle is substantially in a stationary state. The processing which starts in step S701 is executed every 10 ms.

In step S701 in FIG. 7, a decision is made as to whether or not a vehicle speed pulse has been generated over a predetermined length of time (T1). T1 represents the interval over which pulses are generated when the vehicle is traveling at a speed of 1 km/h. If it is decided that no vehicle speed pulse has been generated over the predetermined period of time, the operation proceeds to step S702. In addition, if it is detected in step S701 that the turning center at the vehicle has shifted from right to left or from left to right based upon the quantity of the steering operation performed by the driver, the operation also proceeds to step S702. If neither of the above is the case, i.e., if a vehicle speed pulse has been generated during the predetermined period T1 and the turning center has not changed, the routine ends.

In step S702, the target turning radius Re is set for the steering center radius R for substitution and then the routine ends. As a result, it becomes possible to drastically change the turning radius while the vehicle is in a stationary state. In other words, the driver is allowed to change the attitude angle of the vehicle discontinuously while the vehicle is in a stationary state.

Through the processing in the flowcharts in FIGS. 6 and 7, the steering center radius R and the steering center elevation angle θ are determined, and ultimately, the target steering center (the point Q) can be determined. In correspondence to the target steering center (the point Q) thus determined, the target steering angles for the individual wheels (the front left wheel steering angle δfl*, the front right wheel steering angle δfr*, the rear left wheel steering angle δrl* and the rear right wheel steering angle δrr*) are calculated as described below.

The relationships between the steering angles for the individual wheels and the steering center achieved by varying the individual wheel steering angles (the front left wheel δfl, the front right wheel δfr, the rear left wheel δrl and the rear right wheel δrr) within the adjustment-enabling ranges are ascertained through testing in advance.

Figure 10:
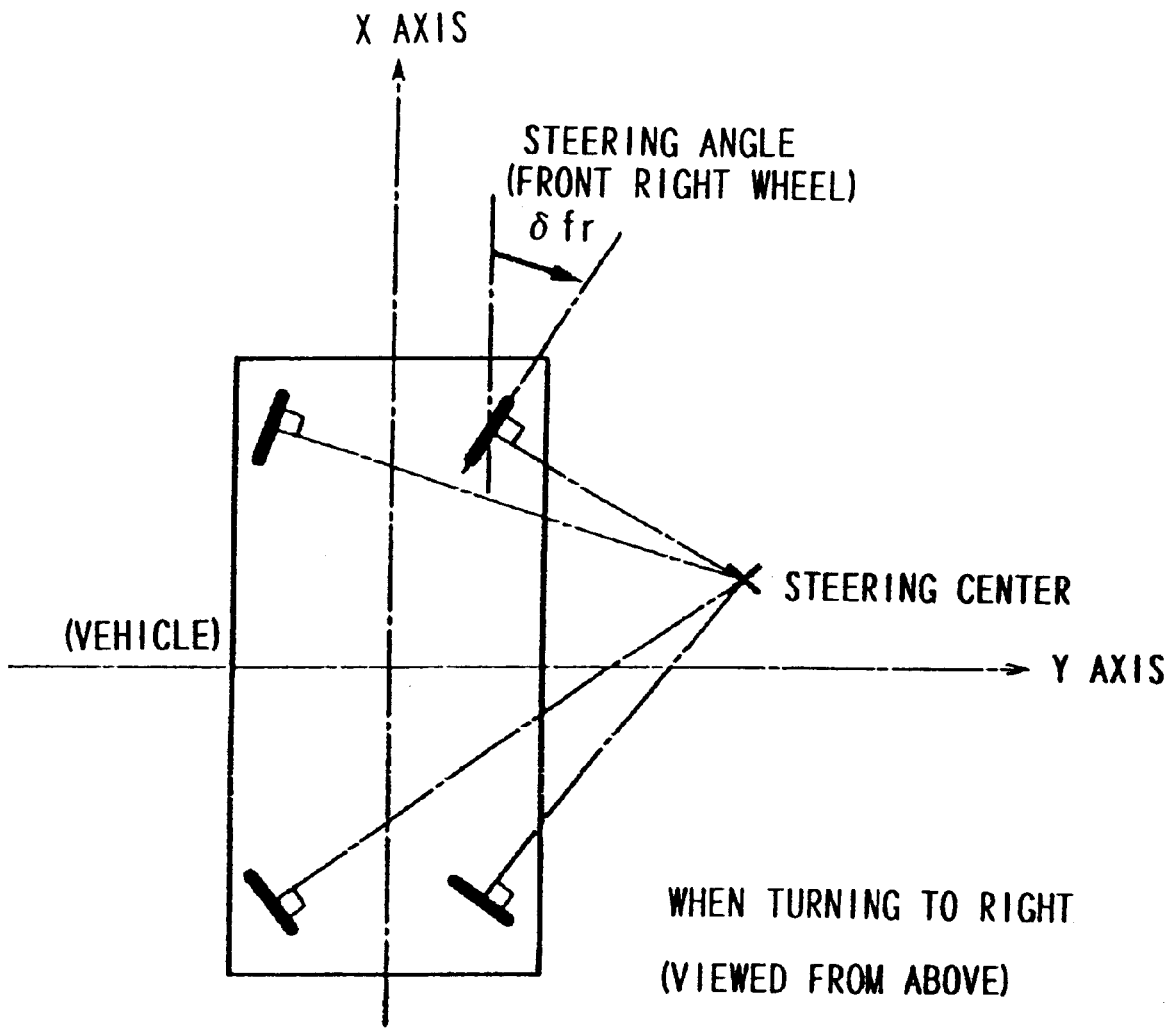
FIG. 10 illustrates a method that may be adopted to calculate the steering angles for the individual wheels through an arithmetic operation.

In these relationships, one steering center is determined in correspondence to specific steering angles at the four wheels. However, if a given steering center is set first, one combination of the steering angles of the four wheels cannot be determined and there are a plurality of possible combinations. From the plurality of such combinations, the combination of the individual wheel steering angles shown in FIG. 10 is selected. In other words, the combination of the steering angles for the wheels that allow the lines connecting the individual wheels and the steering center to extend perpendicular to the orientations of the wheels or a combination approximating such a state is selected.

However, if the steering center is set away from the vehicle over a large enough distance (if the vehicle is advancing almost straight ahead), a combination that results in a toe-in state in which the stability of the vehicle advancing straight is maintained in a satisfactory manner (a state in which the front tires are turned inward relative to the direction along which the vehicle is advancing) is selected. By setting the wheel steering angles in correspondence to the steering center in this manner, the traveling resistance can be reduced when the vehicle is traveling at low speed and the quantity of energy required for traveling can be minimized. In addition, since the sliding angles of the tires at the individual wheels are reduced, the sliding noise is also reduced.

Data of the steering angles for the individual wheels (the front left wheel steering angle δfl, the front right wheel steering angle δfr, the rear left wheel steering angle δrl and the rear right wheel steering angle δrr) made to correspond to the steering center in the achievable range as described above are stored in the ROM. By looking up these data, the target steering angles for the wheels (the front left wheel target steering angle δfl*, the front right wheel target steering angle δfr*, the rear left wheel target steering angle δrl* and the rear right wheel target steering angle δrr*) corresponding to the target steering center point Q can be calculated. The steering center also changes in correspondence to the speed of the vehicle as well as in correspondence to the wheel steering angles. Accordingly, it is even more desirable to ascertain in advance the relationship between the steering center and the vehicle speed through testing, store it in memory as ROM data mentioned earlier and use the ROM data as a vehicle speed look-up table.

The ECU 12 calculates electric current command values to be issued to the DC motors in the individual wheel steering actuators 5~8 from the corresponding drive circuits 20~23 so as to match the steering angles for the individual wheels (the front left wheel steering angle δfl, the front right wheel steering angle δfr, the rear left wheel steering angle δrl and the rear right wheel steering angle δrr) with the calculated target steering angles δfl*, δfr*, δrl* and δrr*.

The method for calculating the individual wheel steering angles is now explained. The relationships between the detection values obtained by the rack stroke sensors 31~34 and the corresponding wheel steering angles are ascertained in advance through testing and the data indicating the relationships are stored in the ROM. By looking up the correlating data, the steering angles for the individual wheels are calculated in correspondence to the detection values obtained by the rack stroke sensors 31~34.

The electric current command values are obtained through a feedback arithmetic operation so as to match the steering angle detection value at each wheel with the corresponding target steering angle. The feedback arithmetic operation may be achieved through PID control, sliding mode control or model reference control. Since all of these control methods are well-known in the public domain, their detailed explanation is omitted.

The vehicle explained above is provided with a mechanism which enables adjustment of the steering angles of the four wheels to be performed independently of one another. However, the present invention may be adopted in conjunction with a mechanism that is not capable of adjusting the left and right steering angles independently of each other as well.

Second Embodiment

Figure 11:
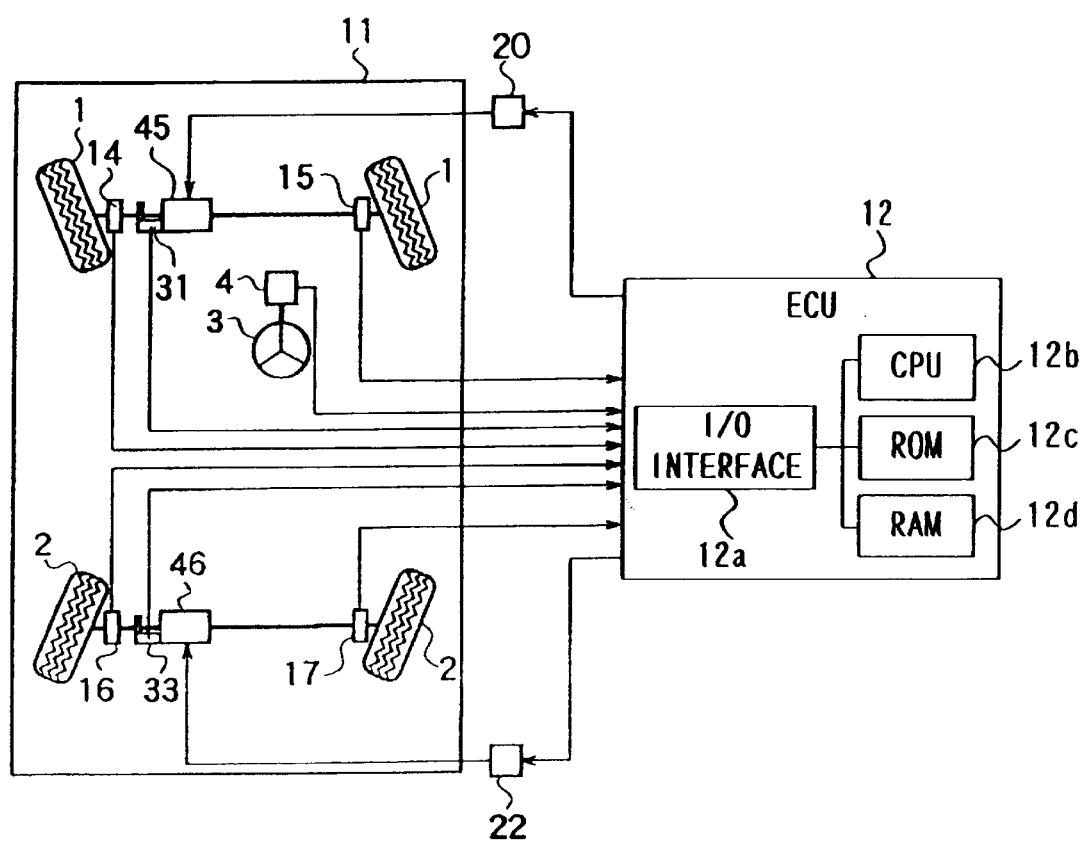
FIG. 11 illustrates the structure of a vehicle in a second embodiment achieved by adopting the vehicle front/rear wheel steering angle control apparatus according to the present invention.

FIG. 11 is a configuration diagram of the second embodiment in which the front/rear wheel steering angle control apparatus according to the present invention is adopted in a vehicle having a mechanism that is not capable of adjusting the left and right steering angles independently of each other at the front and rear wheels.

The second embodiment differs from the front/rear wheel steering angle control apparatus in the first embodiment in the wheel steering actuators it employs. Wheel steering actuators 45 and 46 in the second embodiment each include a DC motor and are each capable of causing a rack to move along the lateral direction via a worm gear. Thus, the steering angles for the left wheel and the right wheel are simultaneously adjusted at both the front and the rear.

In the front/rear wheel steering angle control apparatus in the second embodiment, the ECU 12 calculates the target steering center as in the first embodiment and then calculates the front and rear stroke quantities that will achieve the steering center thus calculated. While the target values calculated by the ECU 12 are the stroke quantities corresponding to the steering angles instead of the steering angles themselves, no problem is posed in actual use by not directly calculating the steering angles. The stroke quantities at the front and rear wheels relative to the steering center are measured through testing and the data indicating the measurement results are stored in the ROM in advance. The target stroke quantities (the front wheels STf*, the rear wheels STr*) for the front and rear wheels are calculated by looking up a table of the data stored in the ROM. As explained earlier, it is even more desirable to store the front and rear wheel stroke quantities corresponding to the vehicle speed to be looked up in correspondence to the vehicle speed, as well.

Feedback control is implemented on the actuators 45 and 46 so as to match the stroke sensor detection values corresponding to the front and rear wheels with the target stroke quantities (the front wheels STf*, the rear wheels STr*) for the front and rear wheels. While the feedback control may be achieved through PID control, sliding mode control or model reference control, a detailed explanation of the method that may be adopted for the feedback control is omitted.

The present invention may be likewise adopted in a front/rear wheel steering angle control apparatus that is not capable of adjusting the left steering angle and the right steering angle independently of each other either for the front wheels or the rear wheels. For instance, the present invention may be adopted in a similar manner in conjunction with a mechanism in which the front wheel steering angles are mechanically determined in conformance to the quantity of a steering operation performed by the driver and only the steering angles at the rear wheels can be adjusted independently of the steering operation quantity. In this case, the ECU12 and the actuators 45 and 46 should be structured in conformance to the example of variation explained earlier, in correspondence to the type of the specific front/rear wheel steering angle control apparatus in which the present invention is adopted.

In the explanation given above, it is assumed that the vehicle is advancing forward. Similar advantages may be achieved when the vehicle is traveling backward by setting the backward direction over the positive range of the x axis. When the vehicle is provided with an automatic transmission, for instance, the vehicle is determined to be advancing forward if the shift lever of the automatic transmission is at the forward position and is determined to be traveling backward if the shift lever is set at the reverse position. In the embodiments, various arithmetic operations are performed by referencing various types of data stored in the ROM. Different ROM data may be used when the vehicle is traveling backward from the ROM data used when the vehicle is advancing forward.

Figure 15A:
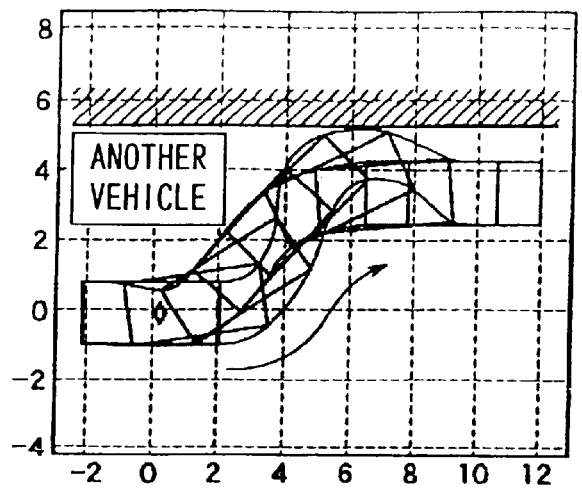
FIG. 15 presents vehicle locus simulation diagrams illustrating vehicular behavior manifesting when parallel parking a vehicle advancing forward, with FIG. 15(a) illustrating the vehicular behavior manifesting in example 1 (front wheel steering), FIG. 15(b) illustrating the vehicular behavior manifesting in example 2 (front and rear wheels steered to equal degrees in reverse phase relative to each other) and FIG. 15(c) illustrating the vehicular behavior manifesting in an embodiment of the present invention.
Figure 15B:
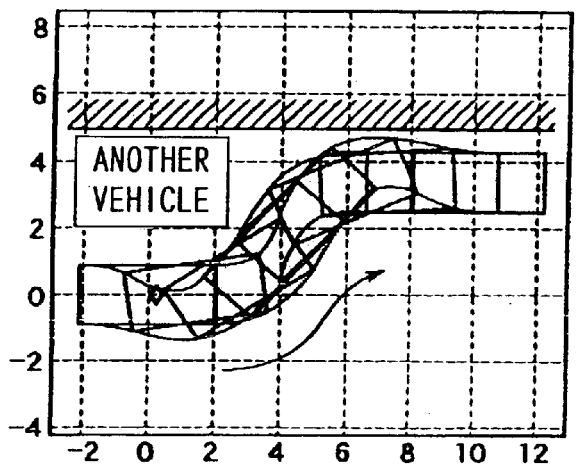
Figure 15C:
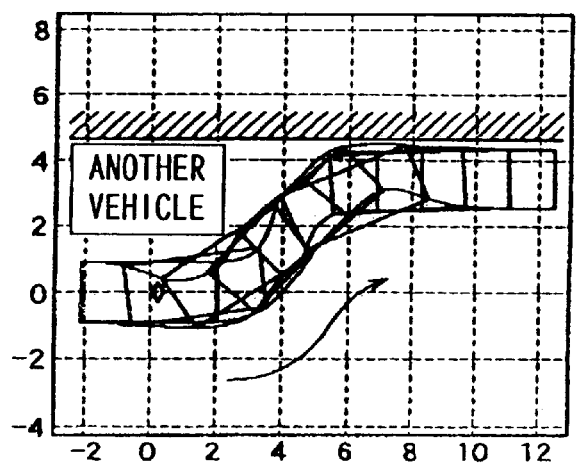

FIG. 15(c) presents an example of the results of a simulation of the vehicular behavior manifesting when a vehicle adopting the present invention is parallel parked. The vehicle is traveling at a constant speed in this simulation. Compared to the vehicular behavior manifesting in examples presented in FIGS. 15(a) and 15(b), the degree to which the right end of the vehicle at the rear juts out is reduced during the initial stage of the parallel parking operation and the degree to which the left side of the vehicle at the front juts out is reduced during the final stage of the parallel parking operation. This improvement is achieved by correcting the vehicle steering center elevation angle along the negative direction when the steering wheel is initially turned and correcting the vehicle steering center elevation angle along the positive direction when the steering wheel is turned back.

With the degree to which any part of the vehicle juts out minimized in this manner, it becomes possible to maneuver the vehicle at the side of the road (to the left in FIG. 15(c)) with ease even when the vehicle is advancing forward. Even if another vehicle is parked at the position indicated in FIG. 15(c) in this situation, a sufficient clearance can be sustained between the parked vehicles as in the methods shown in FIGS. 15(a) and 15(b).

In addition, as shown in FIG. 8, the steering quantity for the front wheels is increased during a turn-contracting operation and the steering quantity for the rear wheels is increased during a turn-expanding operation. FIG. 14 shows changes occurring in the various statuses during the simulation shown in FIG. 15(c). The data presented in FIG. 14 substantiate that the degree to which any part of the vehicle juts out during a parallel parking operation or during a vehicle turning operation can be reduced.

Figure 17A:
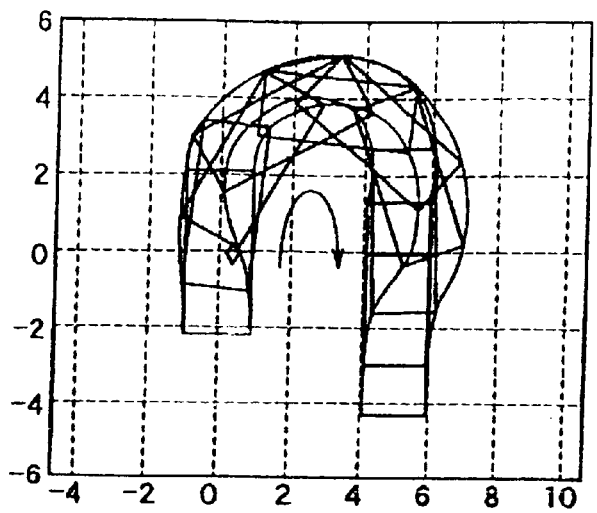
FIG. 17 presents vehicle locus simulation diagrams illustrating vehicular behavior manifesting during a turn, with 17(a) illustrating the vehicular behavior manifesting in example 1 (front wheel steering) , FIG. 17(b) illustrating the vehicular behavior manifesting in example 2 (front and rear wheels steered to equal degrees in reverse phase relative to each other) and FIG. 17(c) illustrating the vehicular behavior manifesting in an embodiment of the present invention.
Figure 17B:
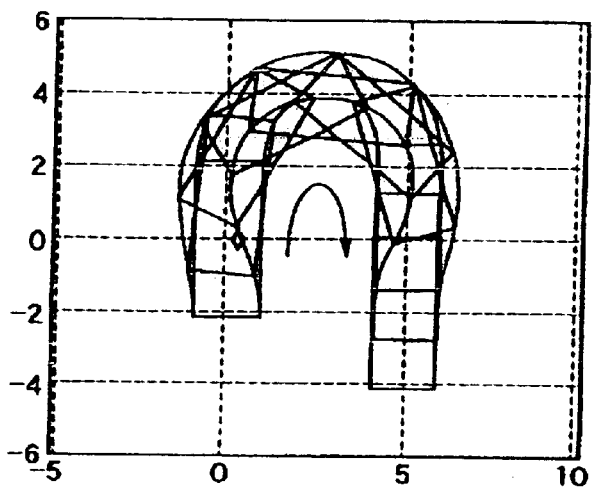
Figure 17C:
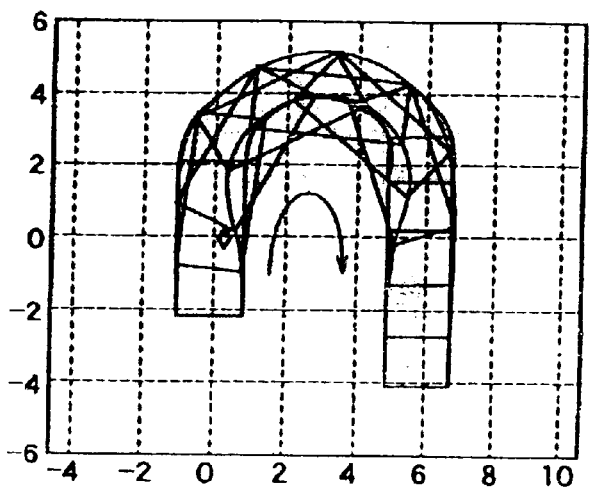

FIGS. 16(c) and 17(c) present examples of the results of simulations of vehicular behavior manifesting when a vehicle adopting the present invention is being turned. As shown in the figures, the degree to which the left side of the vehicle at the front and the left side of the vehicle at the rear jut out can be reduced and, as a result, the psychological onus placed on the driver trying to prevent any contact with an obstacle is reduced. In other words, compared to the examples shown in FIGS. 16(a), 16(b), 17(a) and 17(b), the vehicle can be turned with a greater degree of ease.

The present invention is not restricted by the particulars of the embodiments described above. For instance, the steering operation intermediate quantity STV may be matched with the steering operation quantity ST through control implemented based upon the first-order lag characteristics or the second-order lag characteristics.

In addition, the steering operation intermediate quantity STV may be calculated as the change occurring in the steering operation quantity over time or an STV may be calculated by imposing a limit with regard to the rate of change occurring relative to the travelling distance dz over time on the STV ascertained as the steering operation quantity change occurring over time as described above.

The disclosure of the following priority application is herein incorporated by reference: Japanese Patent Application No. H 2000-287150 filed Sep. 21, 2000.

What is claimed is:

1. A vehicle front/rear wheel steering angle control apparatus comprising;
   a steering angle control device that controls steering angles at front wheels and rear wheels independently of one another;
   a target steering angle calculating device that calculates target steering angles for the front wheels and the rear wheels; and
   a steering angle adjustment device that adjusts the steering angles at the front wheels and the rear wheels of the vehicle so as to match the steering angles with the target steering angles calculated by said target steering angle calculating device, wherein;
   said target steering angle calculating device judges as to whether the vehicle is in a turn-contracting state in which the direction of a steering operation matches the direction of a change made in the steering operation or a turn-expanding state in which the direction of the steering operation is opposite from the direction of the change made in the steering operation; and
   said target steering angle calculating device calculates target steering angles for the front wheels and the rear wheels so as to allot a larger steering quantity to the front wheels compared to the rear wheels if the vehicle is determined to be in a turn-contracting state and calculates target steering angles for the front wheels and the rear wheels so as to allot a larger steering quantity to the rear wheels compared to the front wheels if the vehicle is determined to be in a turn-expanding state.

2. A vehicle front/rear wheel steering angle control apparatus comprising;
   a steering angle control device that controls steering angles at front wheels and rear wheels independently of one another;
   a target steering angle calculating device that calculates target steering angles for the front wheels and the rear wheels; and
   a steering angle adjustment device that adjusts the steering angles at the front wheels and the rear wheels of the vehicle so as to match the steering angles with the target steering angles calculated by said target steering angle calculating device, wherein;
   said target steering angle calculating device includes;
   a reference steering angle calculating device that calculates a reference steering angle achieved when a steering operation quantity is sustained at a constant value in correspondence to the steering operation quantity;
   a steering operation intermediate quantity calculating device that calculates a steering operation intermediate quantity so as to gradually match the steering operation intermediate quantity with the quantity of a steering operation performed by a driver each time a predetermined fixed reference point on the vehicle moves;
   a turn-contracting/turn-expanding judging device that judges as to whether the vehicle is in a turn-contracting state or a turn-expanding state based upon whether or not the direction of a steering operation corresponding to the steering operation intermediate quantity matches the direction of a change made in the steering operation; and
   a reference steering angle correction device that obtains a target steering angle by correcting the reference steering angle so as to achieve a smaller steering center elevation angle compared to a steering center elevation angle achieved when the steering operation quantity is sustained at a constant value if said turn-contracting/turn-expanding judging device judges that the direction of the steering operation corresponding to the steering operation intermediate quantity matches the direction of the change made in the steering operation and obtains a target steering angle by correcting the reference steering angle so as to achieve a larger steering center elevation angle if said turn-contracting/turn-expanding judging device judges that the direction of said steering operation corresponding to the steering operation intermediate quantity is opposite from the direction of the change made in the steering operation.

3. A vehicle front/rear wheel steering angle control apparatus according to claim 1, wherein;

said target steering angle calculating device includes;

a reference steering angle calculating device that calculates a reference steering angle achieved when the steering operation quantity is sustained at a constant value in correspondence to the steering operation quantity;

a turn-contracting/turn-expanding judging device that judges as to whether the vehicle is in a turn-contracting state in which the direction of a steering operation matches the direction of a change made in the steering operation or a turn-expanding state in which the direction of a steering operation is opposite from the direction of the change made in the steering operation; and a reference steering angle correction device that obtains a target steering angle by correcting the reference steering angle so as to achieve a smaller steering center elevation angle if said turn-contracting/turn-expanding judging device judges that the vehicle is in a turn-contracting state and obtains a target steering angle by correcting the reference steering angle so as to achieve a larger steering center elevation angle if said turn-contracting/turn-expanding judging device judges that the vehicle is in a turn-expanding state.

4. A vehicle front/rear wheel steering angle control apparatus according to claim 1, wherein;

when a quantity by which a steering center elevation angle changes relative to a distance over which a specific reference point on the vehicle shifts changes drastically, said target steering angle calculating device calculates target steering angles which will achieve a steering center elevation angle having been corrected so as to ensure that no drastic change occurs relative to the distance over which the specific reference point shifts.

5. A vehicle front/rear wheel steering angle control apparatus according to claim 1, further comprising;

a target turning radius calculating device that calculates a target turning radius of a predetermined reference point based upon the steering operation quantity, wherein;

said target steering angle calculating device sets an upper limit for change in a steering center elevation angle relative to a distance over which the predetermined reference point shifts in correspondence to the steering center elevation angle and the target turning radius calculated by said target turning radius calculating device and calculates target steering angles in conformance to the upper limit thus set.

6. A vehicle front/rear wheel steering angle control apparatus according to claim 5, wherein;

said target steering angle calculating device calculates target steering angles without imposing a limit on the degree of change in the steering center elevation angle if the vehicle is in a stationary state.

7. A vehicle front/rear wheel steering angle control apparatus according to claim 1, wherein;

said target steering angle calculating device calculates target steering angles so as to allow a steering center to be set between a line extending from the front end of the vehicle and a line extending from the rear end of the vehicle compared to a position assumed when the steering operation quantity of the vehicle is sustained at a constant value.

8. A vehicle front/rear wheel steering angle control apparatus comprising;

a steering angle control means for controling steering angles at front wheels and rear wheels independently of one another;

a target steering angle calculation means for calculating target steering angles for the front wheels and the rear wheels; and a steering angle adjustment means for adjusting the steering angles at the front wheels and the rear wheels of the vehicle so as to match the steering angles with the target steering angles calculated by said target steering angle calculation means, wherein;

said target steering angle calculation means judges as to whether the vehicle is in a turn-contracting state in which the direction of a steering operation matches the direction of a change made in the steering operation or a turn-expanding state in which the direction of the steering operation is opposite from the direction of the change made in the steering operation; and said target steering angle calculation means calculates target steering angles for the front wheels and the rear wheels so as to allot a larger steering quantity to the front wheels compared to the steering quantity allotted to the front wheels when a steering operation quantity is sustained at a constant value if the vehicle is determined to be in a turn-contracting state and calculates target steering angles for the front wheels and the rear wheels so as to allot a larger steering quantity to the rear wheels compared to a steering quantity allotted to the rear wheel when the steering operation quantity is sustained at a constant value if the vehicle is determined to be in a turn-expanding state.

9. A vehicle front/rear wheel steering angle control method, comprising;

judging as to whether a vehicle is in a turn-contracting state in which the direction of a steering operation matches the direction of a change made in the steering operation or a turn-expanding state in which the direction of the steering operation is opposite from the direction of the change made in the steering operation;

calculating target steering angles for the front wheels and the rear wheels so as to allot a larger steering quantity to the front wheels compared to the rear wheels if the vehicle is determined to be in a turn-contracting state;

calculating target steering angles for the front wheels and the rear wheels so as to allot a larger steering quantity to the rear wheels compared to the front wheels if the vehicle is determined to be in a turn-expanding state; and adjusting steering angles of the front wheels and the rear wheels independently of one another so as to match the steering angles with the target steering angles that have been calculated.

* * * * *